Patented July 13, 1954

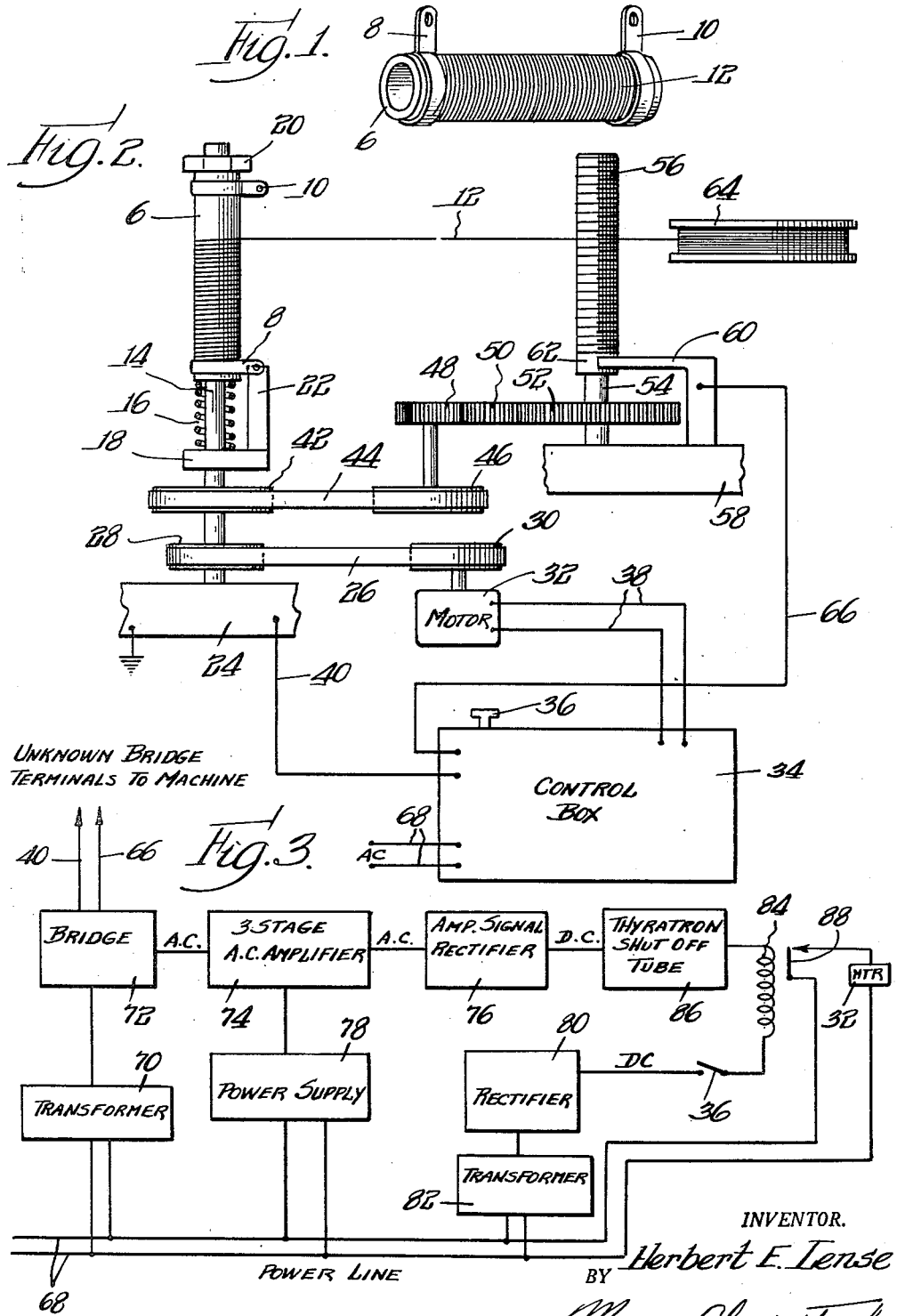

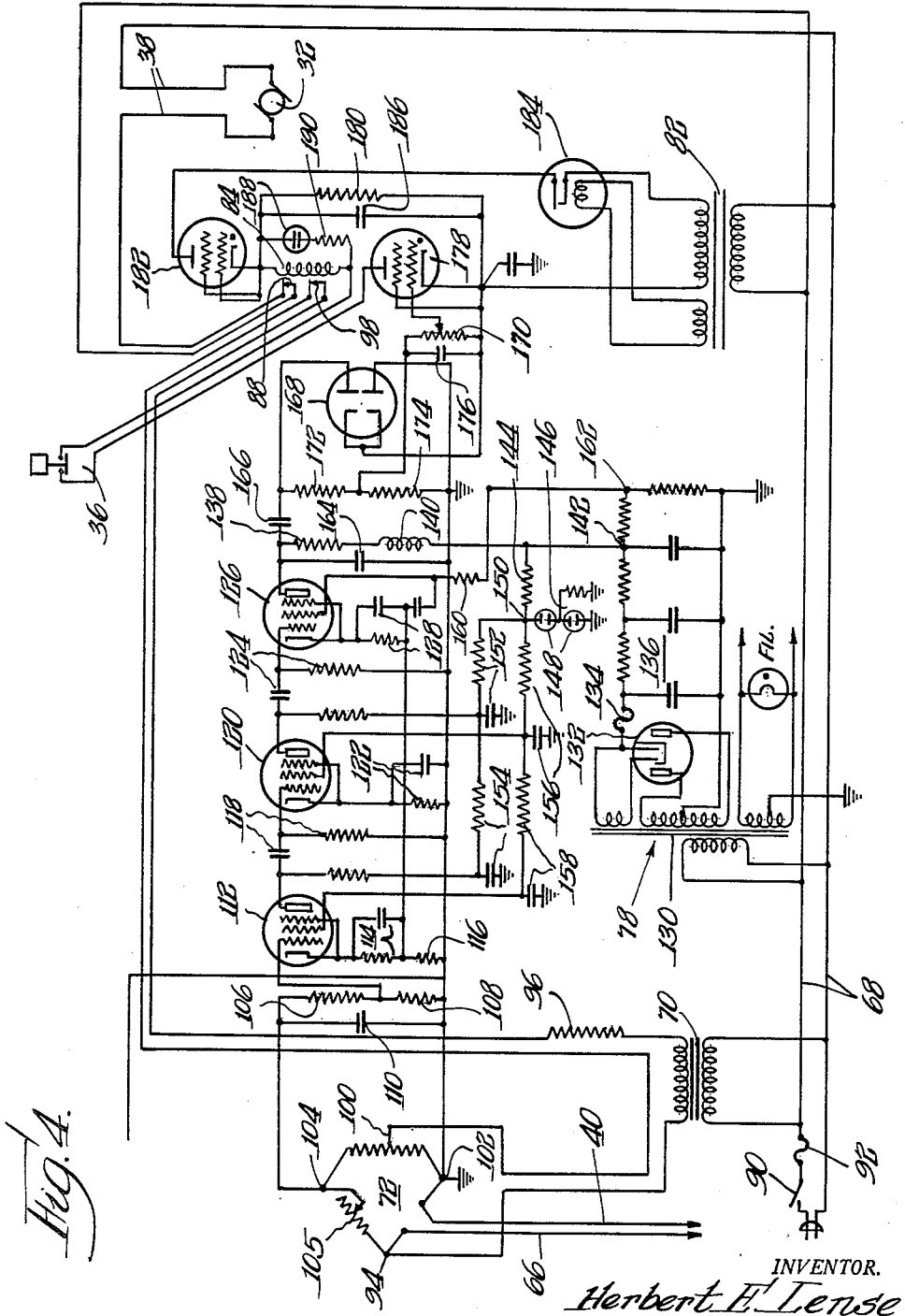

2,683,567

UNITED STATES PATENT OFFICE 2,683,567

RESISTOR WINDING

Herbert E. Lense, Berwyn, Ill., assignor to
David T. Siegel, Glencoe, Ill.

Application December 19, 1949, Serial No. 133,917

6 Claims. (Cl. 242—9)

This invention relates to the manufacture of resistors, and concerns more particularly the accurate predetermination of the resistance value in resistors of the wire wound type in connection with the winding thereof.

Resistors in general fall into several classes of accuracy. In many installations the use of wire wound resistors is indicated, but such resistors as conventionally manufactured frequently do not possess the degree of accuracy required. Wire wound resistors are usually manufactured by winding resistance wire on a core of insulating material which is generally ceramic. If a resistor is manufactured and then its resistance checked, the process is tedious and is not well adapted to mass production methods. Furthermore, the resistance is then fixed and there is nothing that can be done if it is not of the proper value.

It is possible to predetermine the resistance of a wire wound resistor with some degree of accuracy by counting the number of turns applied, when the core diameter and the resistance of the wire per unit of length is known. Such a method is, however, undesirable for if the core is of irregular diameter, the length for a given number of turns cannot be accurately forecast. The tension under which the wire is wound on the core will determine the tightness of the winding and hence the total length, and as the tension may vary from time to time, another unpredictable factor is introduced. Excessive tension may even stretch the wire somewhat and hence change its diameter and consequently its resistivity. Even if the wire is not stretched by excessive tension, the diameter, the shape of the cross section, the composition and the consequent resistivity of any commercially available wire may vary sufficiently from point to point to introduce a considerable error in the resistance desired.

A more accurate method would perhaps be to measure the actual length of the wire wound on the core rather than the number of turns. This would eliminate any errors due to irregular core diameter or tightness of winding, but errors would still be introduced due to the variations in the gauge of the wire, in the cross section and in the composition of the wire, and in any stretching caused by excessive tension.

In accordance with the present invention, the resistance value of the resistor is measured, accurately, during the wire winding operation, and the operation automatically terminated when the desired resistance value is reached.

A principal object of this invention is the provision of an improved resistor and of apparatus and methods for making such a resistor.

A more specific object is the provision of means and methods for manufacturing a wire wound resistor of the desired resistance, in which the resistance of the resistor is measured during its manufacture.

An additional object of the invention is to provide means and methods for making a resistor as outlined above, in which the resistance is measured with apparatus of high sensitivity.

A further object of the invention is the provision of resistance measuring control means which have very rapid action at the cut-off point when the desired resistance is reached.

Yet another object of the present invention is the provision of resistance measuring control means which are largely immune from transitory variations in the resistance value.

Other and further objects and advantages of this invention will be apparent from a perusal of the following description when taken in conjunction with the accompanying drawings in which:

Fig. 1 is a perspective view of a precision resistor produced by my means and methods;

Fig. 2 diagrammatically indicates apparatus capable of carrying out my invention;

Fig. 3 is a block diagram of the electrical control circuit associated with the apparatus of Fig. 2; and Fig. 4 is a schematic diagram of the electrical circuit.

Generally, to carry out my invention, I plan to utilize a wire winding machine similar to that disclosed by H. Chanowitz in his Patent No. 2,460,807, issued February 8, 1949. A terminal lug from which the wire is wound is grounded to the machine and the distributing lead screw is insulated. A Wheatstone bridge, in conjunction with an amplifying system of novel construction, is utilized to measure the resistance of the wire between the lead screw and the ground connection and to automatically shut off the driving motor when a predetermined resistance has been reached. The length of wire between the resistor and the lead screw will be a constant for each winding operation and introduces no error. Indeed, if desired, the time lag between the breaking of the motor circuit and the stopping of the machinery may be adjusted to wind the length of wire between the lead screw and resistor onto the resistor core. The electrical circuit is so designed that transitory variations in resistance value, such as for example the catching of a piece of dust on the lead screw, do not shut off the machine.

Referring more particularly to the figures, there is illustrated in Fig. 1 a precision resistor comprising a ceramic core 6 having lugs 8 and 10 adjacent each end and resistance wire 12 coiled about the core therebetween. The wire may be secured to the lugs by any desirable means, such as soldering or welding, the latter being disclosed in the aforementioned Chanowitz patent.

As illustrated in Fig. 2, the core 6 may be mounted on a winding spindle 14 for the application of the wire. A compression spring 16 is mounted about the spindle abutting a collar 18 and the core is screwed up against the spring by means of a nut 20. A terminal clamp 22, mounted on the collar 18, clampingly engages one of the lugs 8 to ground it to the spindle 14, and hence to the frame 24 of the winding machine on which the spindle is mounted. The spindle is driven by means such as a belt 26 engaging a pulley 28 on the spindle and a pulley 30 on the shaft of a motor 32. The motor 32 is powered by leads 38 from a control box 34 having a motor start switch 36 and A. C. input leads 68. A connection 40 is provided between the frame 24 and the control box.

A second pulley 42 is mounted on the spindle 14 and is engaged by a belt 44 to drive a pulley 46. On the same shaft with the pulley 46 is a gear 48 which may drive an idler gear 50 to drive an insulating fiber gear 52 which is mounted on the shaft 54 of a lead screw 56. The shaft 54 is journaled in an insulated frame 58 and a brush 60 which is mounted on the insulated frame engages a slip ring 62 on the lead screw shaft. The wire 12 being wound on the core 6 is supplied from a supply spool 64 and engages the threads of the lead screw 56 in order to be advanced along the core 6. An electrical connection 66 is provided between the brush 60 and the control box 34.

As shown in a block diagram of Fig. 3, the power line 68 is connected to a transformer 70 which supplies power to a Wheatstone bridge 72. The lead lines from the top of the bridge lead to the frame and brush and are the same as the lines 40 and 66 in Fig. 2. The bridge feeds a three-stage amplifier 74 which amplifies the A. C. signal from the bridge and feeds it onto a signal rectifier 76. The amplifier 74 is provided with power from a power supply 78 connected to the power line 68. A rectifier 80 receives A. C. power from a transformer 82 which is connected to the power line 68 and supplies D. C. power through a motor control relay coil 84 to a thyratron shut-off tube 86 which is controlled by the D. C. output of the rectifier 76. The motor control relay coil is connected in series with the motor control switch 36 previously mentioned, and acts to open a motor switch 88 in series with the motor 32 in its connection to the power line 68.

In Fig. 4 is shown a detailed schematic diagram of the control apparatus shown in Fig. 3. The power line 68 may be provided with a master switch 90 and a circuit breaker or fuse 92. The transformer 70 is connected directly to one apex 94 of the Wheatstone bridge 72. The transformer is also connected through a current limiting resistor 96 and normally closed relay contacts 98, actuated by the motor control relay 84 to the opposite apex 100 of the bridge. The apex 100 actually constitutes a slidable tap on a single resistor, but this is electrically the equivalent of the conventional form of Wheatstone bridge, and it is more convenient. Another apex 102 of the bridge is grounded and is connected to the lead wire 40 from the grounded winding machine frame. The other lead wire 66 is connected to the apex 94 so that the arm between the apices 94 and 102 is the unknown arm of the bridge. The heretofore unreferred to apex 104 is connected by an adjustable arm on a resistor 105 to apex 94 and is connected to a voltage divider network comprising resistors 106 and 108. A capacitor 110 is connected in parallel with the resistors 106, 108 to remove high frequencies from the signal, and the junction between the resistors 106 and 108 is connected to the control grid of an amplifying tube 112. The amplifying tube is preferably of the multigrid type in order to provide high amplification. The cathode of the tube 112 is provided with cathode bias by the usual resistor-capacitor combination 114 which is grounded through a resistor 116. The output of the tube 112 is connected by means of a conventional coupling network 118 to the grid of a second amplifier tube 120, which is also preferably of the multigrid type and is cathode biassed by the usual resistor-capacitor combination 122. The output of the tube 120 is fed by means of a conventional coupling network 124 to the control grid of a third amplifier tube 126. This tube is also provided with cathode bias by means of the usual resistor-capacitor combination 128 which is grounded through the previously mentioned resistor 116. The common cathode or ground resistor 116 of the tubes 112 and 126 provides inverse feedback in order to minimize changes in line voltage, tube parameters, etc., and to provide a certain amount of limiting action.

The power supply 78 previously referred to comprises a conventional transformer 130 and full wave rectifier 132 feeding through a fuse 134 to a filter network 136. The third amplifier tube 126 is supplied with power through a plate load resistor 138 and an inductance 140 from a point 142 on the filter. The same point 142 is connected through a resistor 144 to a voltage regulating network 146 including voltage regulator tubes 148. From one point 150 on the regulating network, plate power is supplied to the tubes 112 and 120 through decoupling networks 152 and 154, and from the same point screen grid potential is supplied to the tubes 112 and 120 through decoupling networks 156 and 158. Screen grid potential is supplied to the tube 126 through a resistor 160 connected to another point 162 on the filter 136.

The output of the tube 126 is shunted by a capacitor 164 of low value, and the plate of tube 126 is connected through a coupling capacitor 166 to a diode signal rectifier 168. The rectifier 168 is connected as a full wave rectifier with the cathodes connected together through a load resistor 170 to the junction of a pair of resistors 172 and 174 connected in series across the output of the tube 126. A capacitor 176 of rather large size is connected in parallel with the load resistor 170 so that the potential thereacross will not vary too rapidly and the circuit will not respond to transitory variations in resistance. A tap on the resistor 170 is connected to the control grid of a thyratron regulator 178 and is adjustable to compensate for individual differences between thyratrons. The cathode of the control tube 178 is connected to one arm of the power transformer 82 and is also connected to one end of a load resistor 180 of a thyratron 182 diode-connected as a gas filled rectifier. The anode of the rectifier 182 is connected through a delay relay 184 to the other end of the arm of the transformer 82 to which the cathode of the control tube 178 is connected. The delay relay prevents the application of plate potential to the rectifier 182 until such time as the filaments have heated. The resistor 180 is paralleled by a capacitor 186 to constitute a filter, and has connected in parallel with it the series combination of the motor relay coil 84 and the motor control switch 36. The relay coil 84 is paralleled by an indicator tube 188 in series with a resistor 190. The normally closed switch 88 associated with the relay coil 84 is connected in series with the motor 32 and connected across the power line 68 as previously noted.

To initiate a winding cycle, the operator momentarily opens the normally closed starting switch 36, which deenergizes relay coil 84, permitting switches 88 and 98 to close to apply current to the winding motor 32 and to the control bridge circuit. At the start of any winding cycle the Wheatstone bridge is badly out of balance. This causes a relatively large potential to be applied to the grid of the first amplifier tube 112 and results in a large negative bias on the control tube 178. The control tube 178 is thus cut off and no current is carried by the relay coil 84 even after the switch 36 is permitted to close. The amount of unbalance at the start would be sufficient to ruin a galvanometer of appreciable sensitivity such as is usually used in conjunction with a Wheatstone bridge, but in the circuit illustrated, there is a limiting and clipping action provided by the amplifier circuit, so as to keep the negative voltage applied to the grid of the control tube 178 from exceeding a reasonable value. Within large limits, however, it makes very little difference what negative voltage is applied to the grid of the control tube 178, so long as the grid is maintained below cut-off.

As the wire winds onto the core 6 the resistance across the unknown arm of the Wheatstone bridge increases, and the amount of unbalance decreases so that a lesser signal is fed to the control grid of the amplifier tube 112. With the lesser input, the limiting action is less severe with the result that the change of potential on the grid of the control tube 178 is not proportional to the change on the bridge unbalance. The capacitor 176 is sufficiently large that transitory variations in resistance and in the consequent unbalance of the bridge do not cause the control tube 178 to fire.

As the resistance wound on the core 6 nears the correct value, the unbalance on the bridge becomes much less and the grid of the control tube 178 approaches firing potential. At the precise moment that balance is reached on the bridge there is no input to the first amplifier tube 112 and consequently no output from the rectifier 168. As a result the control tube 178 fires, and current is passed through the relay coil 84, which concurrently opens the motor circuit and removes the potential applied to the Wheatstone bridge. The winding operation stops at a predetermined point, and the wire may be welded to the second lug 10 and cut off as disclosed in the aforementioned Chanowitz patent, or it may be suitably secured to the lug in any other manner. During the securing and cutting operation and until the next resistor is started the resistance across the unknown arm of the Wheatstone bridge varies rapidly over wide limits, but this has no effect whatsoever, as there is no potential applied to the bridge at this time.

When it is desired to start another winding cycle, the motor control switch 36 is pushed to open the plate circuit of the control tube 178 and stop the flow of current through the relay 84. This allows the normally closed relay switches 88 and 98 to close and starts the motor 32 and again applies potential to the Wheatsone bridge 72. The Wheatstone bridge is, of course, at this time unbalanced and a negative output is supplied by the rectifier 168 to bias the control tube 178 beyond cut-off so that the motor control switch 36 may be released and returned to its normally closed position.

It should now be apparent that I have presented means and methods for constructing wire wound resistors with a high degree of accuracy. Indeed, it has been found that the resistor produced will be accurate to within one per cent, and less, of a desired value.

An important feature of the invention is the sensitivity of the control circuit at cut-off, as compared with its much less sensitivity at other times. As previously indicated, a galvanometer such as is usually used to indicate the balance of a bridge would be destroyed by the tremendous unbalance at the start of the winding operation, if the galvanometer were to be sufficiently sensitive at the cut-off point. My amplifier circuit is highly sensitive at cut-off, but limits the amplification of the unbalance when the unbalance is great, prior to the cut-off point.

It is further to be noted that the control element is a thyratron tube which is not damaged by the application of a negative potential far beyond cut-off. The circuit is rapid in its response at the precise moment of balance of the bridge, so that the control tube fires to instantaneously stop the drive motor and remove potential from the Wheatstone bridge. While highly sensitive at cut-off, the operation of the circuit is not disturbed by transitory variations in the winding resistance value, due to dirt on the lead screw, or like matters.

A precision resistor wound in accordance with its actual desired resistance value, and measured thereby, is thus produced by means and methods which are well adapted to mass production methods.

The desired resistor value may be reset at any time by adjustment of the bridge leg 105, so that resistors of any desired resistance value may be made.

It is to be understood that my invention is not to be limited by the foregoing illustrative example, but only by the appended claims.

I claim:

1. Means for manufacturing resistors of the type having a resistive element wound on a non-conductive core comprising means for rotating said core, means for advancing said resistive element axially relative to said core, bridge balancing means, means for including the resistive element being wound on said core in one arm of said bridge balancing means, a gas filled electron tube, means for developing a biasing potential in response to unbalance of said bridge means, said biasing potential normally rendering said gas filled electron tube nonconductive but dropping in response to balance of said bridge balancing means to allow said gas filled electron tube to break down and become conductive, said last named means including means for minimizing the effect of bridge unbalance on said electron tube when the unbalance is large and means for maximizing the effect when the unbalance is small, a relay coil in the plate circuit of said electron tube, means for applying potential to said bridge balancing means, including normally closed switch contacts openable by said relay coil, and normally closed switch means openable by said relay coil for supplying potential to said driving means, both said switch contacts and said switch means opening in response to conduction of said electron tube to remove potential from said bridge balancing means and from said driving means.

2. Means for manufacturing resistors as defined in claim 1 in which means are provided for dropping the plate potential of the gas filled electron tube to cut off said tube.

3. Means for making resistors comprising means for winding an elongated resistance element onto a non-conducting support, driving means for operating said winding means, bridge balancing means, means for including the resistance of the resistance element being wound on the support in one arm of the bridge, an amplifier connected to the output of the bridge for developing a biasing potential in response to unbalance of the bridge, said amplifier limiting the biasing potential developed when the unbalance of the bridge is large, a gas filled tube having its control electrode connected to said amplifier and controlled by the biasing potential to render the tube non-conductive when said bridge is unbalanced and conductive when said bridge is balanced, and control means in the plate circuit of said gas filled tube actuated by current in the plate circuit when said tube is rendered conductive to stop said driving means when the bridge is balanced.

4. In apparatus for winding resistors, means for winding an elongated resistance element, driving means for operating said winding means, a bridge circuit including said resistance element in one arm thereof, potential applying means connected to said bridge, amplifier means connected to said bridge circuit responsive to unbalance thereof for developing a biasing potential, substantially no biasing potential being developed when said bridge is balanced, said amplifier means including means for limiting the biasing potential when the unbalance of the bridge is large, a gas filled tube having its grid connected to said amplifier means and controlled by the biasing potential to render said tube non-conductive when said bridge is unbalanced and conductive when said bridge is balanced, and control means in the plate circuit of said gas filled tube actuated by current in said plate circuit when said tube is rendered conductive to stop said driving means when said bridge is balanced.

5. In apparatus for winding resistors as defined in claim 4, wherein said control means includes a switch actuated when said gas filled tube is rendered conductive to disconnect said potential applying means from said bridge.

6. In apparatus for winding resistors as defined in claim 4, wherein a reactance element is connected to the grid of the gas filled tube to prevent transitory disturbances from rendering said tube conductive.

References Cited in the file of this patent

UNITED STATES PATENTS

| Number | Name | Date |
|---|---|---|
| 1,977,697 | Rockwood | Oct. 23, 1934 |
| 2,199,603 | Ackley | May 7, 1940 |
| 2,319,413 | Leathers et al. | May 18, 1943 |